United States Patent
Lee

(10) Patent No.: US 8,910,423 B2
(45) Date of Patent: Dec. 16, 2014

(54) DOOR WEATHER STRIP FOR MOTOR VEHICLE

(71) Applicants: Hyundai Motor Company, Seoul (KR); Kia Motors Corporation, Seoul (KR)

(72) Inventor: Jong Hae Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/023,066

(22) Filed: Sep. 10, 2013

(65) Prior Publication Data

US 2014/0157679 A1    Jun. 12, 2014

(30) Foreign Application Priority Data

Dec. 10, 2012    (KR) ........................ 10-2012-0143082

(51) Int. Cl.
*E06B 7/22* (2006.01)
*B60J 10/04* (2006.01)
*B60J 10/00* (2006.01)

(52) U.S. Cl.
CPC ............ *B60J 10/041* (2013.01); *B60J 10/0042* (2013.01)
USPC ........................................ 49/498.1; 49/490.1

(58) Field of Classification Search
USPC .................................. 49/490.1, 498.1, 475.1
See application file for complete search history.

(56) References Cited

U.S. PATENT DOCUMENTS

| 5,866,232 A * | 2/1999 | Gatzmanga .................. 428/122 |
| 6,442,902 B1* | 9/2002 | Van Den Oord ............ 49/498.1 |
| 6,849,310 B2* | 2/2005 | Willett ............................ 428/31 |
| 8,402,696 B2* | 3/2013 | Iwasa et al. .................. 49/490.1 |
| 2004/0031203 A1* | 2/2004 | Russell et al. ............... 49/498.1 |
| 2005/0076574 A1* | 4/2005 | Nishihara .................... 49/490.1 |
| 2008/0229670 A1* | 9/2008 | Iwasa et al. .................. 49/490.1 |
| 2012/0031009 A1* | 2/2012 | Iwasa et al. .................. 49/490.1 |

FOREIGN PATENT DOCUMENTS

| JP | 60213525 A | * 10/1985 | ................ B60J 5/04 |
| JP | 06-032428 Y2 | 8/1994 | |
| JP | 2003-200737 A | 7/2003 | |
| JP | 2003-237378 A | 8/2003 | |
| JP | 2004-538195 A | 12/2004 | |
| KR | 10-2009-0032162 A | 4/2009 | |

* cited by examiner

*Primary Examiner* — Jerry Redman
(74) *Attorney, Agent, or Firm* — McDermott Will & Emery LLP

(57) ABSTRACT

A door weather strip for a vehicle includes a weather strip body, an upper rib, a lower rib and a sealing portion. The weather strip body has an assembly groove. The upper rib and lower rib extend outward from one side of the weather strip body at a predetermined distance in a height direction of the weather strip body. The sealing portion is integrally connected with the upper rib and the lower rib.

14 Claims, 4 Drawing Sheets

| | Weather strip according to invention | | | | Weather strip according to related art | | | |
|---|---|---|---|---|---|---|---|---|
| Seal'g shape |  | | | |  | | | |
| | 70°C × 20H | | | | | | | |
| RESULT | D-2 | D0 | D+2 | Shape change rate | D-2 | D0 | D+2 | Shape change rate |
| Initial | 0.59 | 0.62 | 0.59 | - | - | 0.44 | 2.38 | - |
| 70°C × 20H | 0.48 | 0.59 | 0.60 | 19.1% | - | 0.29 | 3.25 | 33.5% |

DOOR WEATHER STRIP FOR MOTOR VEHICLE

CROSS-REFERENCE TO RELATED APPLICATION

This application claims benefit of priority to Korean Patent Application No. 10-2012-0143082 filed in the Korean Intellectual Property Office on Dec. 10, 2012, the entire contents of which are incorporated herein by reference.

TECHNICAL FIELD

The present inventive concept relates to a door weather strip for a vehicle. More particularly, the present inventive concept relates to a door weather strip for a vehicle, of which sealing performance is improved by an elliptical tube-shaped sealing portion.

BACKGROUND

In general, predetermined-sized windows are formed in the doors of vehicles and the windows are opened/closed by window glasses that can be moved up/down.

A door weather strip is installed along the edge of the window to prevent foreign substances such as water or dust from flowing into a gap between the window and the window glass and to block noise transmitted to the interior of a vehicle, when the window is closed with the window glass.

The door weather strip has another function of stably supporting the window glass, when the window glass is moved up/down, and suppressing vibration or tremble of the window glass by supporting the window glass in close contact with it, when the door is opened/closed.

The door weather strip is usually made of an elastic material such as rubber and includes a weather strip body mounted on the door trim or a door panel and one or more sealing lips extending outward from the weather strip body in close contact with the window glass.

When the door weather strip with the structure described above is repeatedly used for a long period of time, the elasticity of the door weather strip is decreased by aging, such that the contact force between the sealing lips and the window glass decreases and thus the air-tightness of the door weather strip decreases.

Therefore, it is necessary to improve the air-tightness of the door weather strip and increase the lifespan by enhancing the shape of the sealing lips and the structural characteristics in the door weather strip.

The above information disclosed in this Background section is only for enhancement of understanding of the background of the inventive concept and therefore it may contain information that does not form the prior art.

SUMMARY

The present inventive concept has been made in an effort to provide a door weather strip for a vehicle having advantages of being able to improve air-tightness and also increase a lifespan, by increasing contact force between the door weather strip and a door glass.

An aspect of the present inventive concept relates to a door weather strip for a vehicle, including a weather strip body having an assembly groove, an upper rib and a lower rib extending outward from one side of the weather strip body at a predetermined distance in a height direction of the weather strip body, and a sealing portion integrally connected with the upper rib and the lower rib.

The sealing portion may have a closed cross-section.

The closed cross-section of the sealing portion may have the shape of an ellipse.

The sealing portion may have an elliptical shape that includes the elliptical closed cross-section and that has a long axis and a short axis.

The length ratio of the long axis to the short axis may be 2:1.

The eliptical shape may be disposed at an angle of 35 degrees with respect to a vertical axis in the height direction of the weather strip body.

The upper rib may extend at an angle downward with respect to the height direction of the weather strip body.

The upper rib may extend at an angle of 45 degrees with respect to the vertical axis in the height direction of the weather strip body.

The upper rib may be connected with the sealing portion at a one-quarter point of the long axis of the sealing portion. The lower rib may extend in an arc shape upward in the height direction of the weather strip body.

The upper rib may extend straight to have a longitudinally uniform thickness.

The lower rib may extend in an arc shape upward in the height direction of the weather strip body.

The lower rib may integrally extend from one end of one side of the weather strip.

The lower rib may gradually decrease in thickness in a longitudinal direction of the weather strip body.

The horizontal length ratio of the entire deformation section $L1+L2$ of the weather strip including the sealing portion, the upper rib, and the lower rib to the sealing portion may be $3:2$, $(L1+L2):L2=3:2$, where $L1$ may be a horizontal length of the upper rib and the lower rib from the weather strip body and $L2$ may be a horizontal length of an elliptic orbit of the sealing portion.

According to an aspect of the present inventive concept, since an elliptical tube-shaped sealing portion is in close contact with a door glass over a large area, air-tightness is improved.

Ribs of a door weather strip are generally deformed in addition to the sealing portion and stress due to an external force applied to the door weather strip is distributed throughout the sealing portion, the ribs, and a weather strip body, when the elliptical tube-shaped sealing portion is deformed in close contact with the door glass. Thus, durability of the door weather strip is improved and the lifespan is also increased.

Further, the shape change range due to the external environment is small and contact force for making the sealing portion in close contact with the door glass is increased, thereby improving air-tightness. In addition, the change in reaction force due to position variation of the door glass is also small. Thus, it is possible to keep uniform supporting and airtight performance when moving a door glass up/down.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
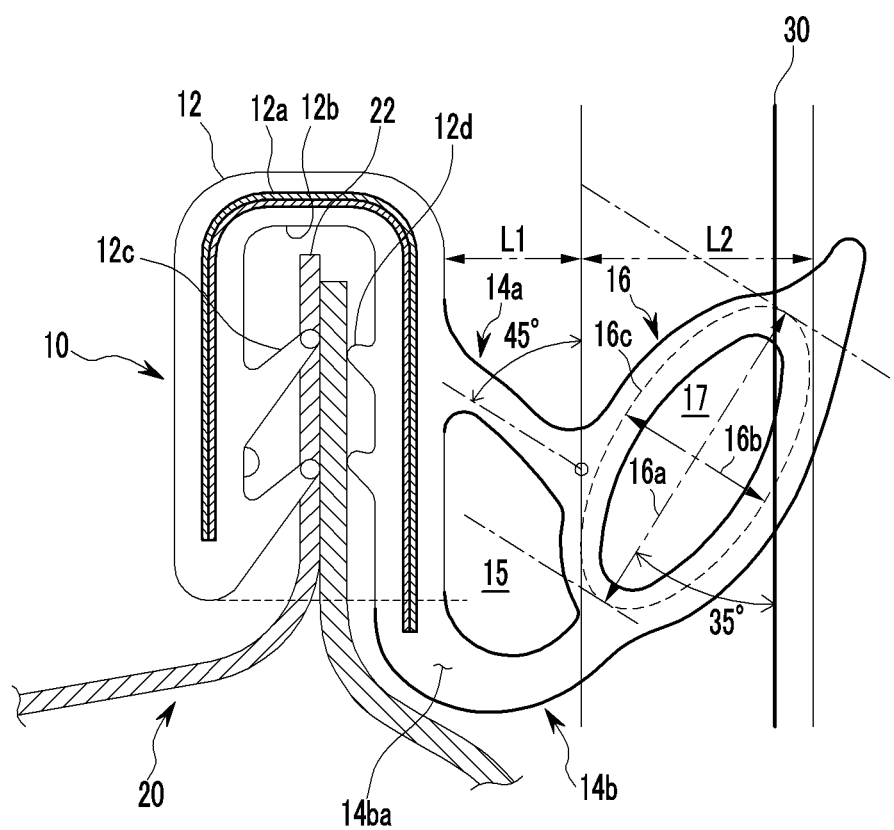
FIG. 1 is a cross-sectional view showing a door weather strip for a vehicle according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification.

Exemplary embodiments of the present inventive concept will be described hereafter in detail with reference to the accompanying drawings.

Referring to FIG. 1, a door weather strip 10 for a vehicle according to an exemplary embodiment of the present inventive concept may be mounted and supported on a door panel 20.

The door weather strip 10 according to an exemplary embodiment of the present inventive concept may be a door belt inside weather strip mounted along an edge of a window formed on a door.

The door panel 20 may have a flange 22 protruding upward. The door weather strip 10 may be fitted and supported on the flange 22.

The door weather strip 10 may be installed on door-related parts such as a door trim, other than the door panel 20.

The door weather strip 10 may include a weather strip body 12 fitted on the flange 22.

The weather strip body 12 may include a supporting member 12a covering the flange 22 from above.

The supporting member 12a may be formed by overlapping two thin brackets having appropriate rigidity and may be inserted in the weather strip body 12.

The supporting member 12a may have a substantially U-shaped cross-section to be able to cover the flange 22 from above.

The weather strip body 12 may have a substantially U-shaped cross-section to be fitted on the flange 22 by inserting the supporting member 12a.

The weather strip body 12 may have an assembly groove 12b with one side open such that the flange 22 can be inserted therein.

One or more sealing lips 12c and 12d may extend toward the flange 22, on both sides of the strip body 12 facing each other where the assembly groove 12b is formed.

The sealing lip 12c formed on one of the both sides of the strip body 12 where the assembly groove 12b is formed may be formed to be longer than the sealing lip 12d formed on the other of the both sides of the strip body 12, but may be formed with the same length.

The sealing lips 12c and 12d may be formed at an angle with respect to opposite sides of the flange 22 and in close contact with the opposite sides of the flange 22.

The sealing lips 12c and 12d may be inclined toward a bottom of the assembly groove 12b, in close contact with the opposite sides of the flange 22.

Two ribs 14a and 14b may integrally extend from the weather strip body 12 in a width direction of the weather strip body 12, on one side of the weather strip body 12.

The upper rib 14a of the two ribs 14a and 14b, which is disposed at an upper position in a height direction of the weather strip body 12, may extend from an upper portion of the one side of the weather strip body 12.

The lower rib 14b of the two ribs 14a and 14b, which is disposed at a lower position in the height direction of the weather strip body 12, may extend from a lower end of the one side of the weather strip body 12.

The upper rib 14a may extend from the weather strip body 12 substantially straight at an angle with respect to the height direction, while the lower rib 14b may extend from the weather strip body 12 in a substantially arc shape upward in the height direction.

The upper rib 14a may have a downward inclination angle of 45 degrees with respect to the height direction.

The lower rib 14b may have a base 14ba connected with the weather strip body 12, from which thickness of the lower rib 14b gradually decreases as the lower rib 14b longitudinally extends away.

An end of the upper rib 14a and an end of the lower rib 14b may be integrally connected with an elliptical tube-shaped sealing portion 16.

Since the upper rib 14a and the lower rib 14b may extend from the weather strip body 12 and may then be integrally connected with the sealing portion 16, a first closed cross-section 15 may be defined by a lower outer side of the weather strip body 12 between the upper rib 14a and the lower rib 14b, the upper rib 14a, the lower rib 14b, and a lower outer side of the sealing portion 16 between the upper rib 14a and the lower rib 14b.

The sealing portion 16 may seal a gap between the door panel 20 and a door glass 30, being in close contact with the door glass 30.

The upper rib 14a may cause the sealing portion 16 to deform by pressing the sealing portion 16, when the sealing portion 16 deforms in close contact with the door glass 30.

The lower rib 14b may cause the sealing portion 16 to bend toward the weather strip body 12 and may change in thickness, as described above, such that uniform deformation behavior is generated throughout the lower rib 14b.

The sealing portion 16 may be inclined at 35 degrees upward with respect to the height direction of the weather strip body 12 or with respect to a vertical axis. The sealing portion 16 may have an elliptical closed cross-section 17.

The sealing portion 16 may have an elliptical shape with a length ratio of 2:1 as a length ratio of a long axis 16a to a short axis 16b.

Further, the horizontal length ratio of the entire deformation section L1 +L2 of the weather strip including the sealing portion 16, the upper rib 14a and the lower rib 14b to the sealing portion 16 may be 3:2.

That is, for example, (L1 +L2):L2=3:2.

L1 is a horizontal length of the upper rib 14a and the lower rib 14b from the weather strip body 12 and L2 is a horizontal length of an elliptic orbit 16a of the sealing portion 16.

The upper rib 14a may be integrally connected with the sealing portion 16 at a one-quarter point of the long axis 16a of the sealing portion 16.

Figure 2:
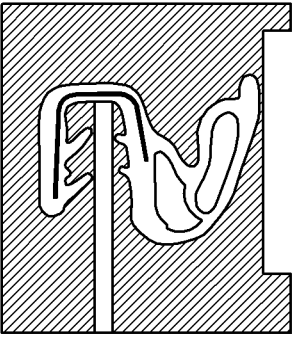
FIG. 2 is a diagram showing a result of test of comparing performance of a door weather strip according to an exemplary embodiment of the present inventive concept with a door weather strip according to the related art.
Figure 2:
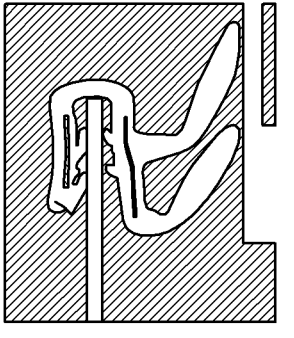

FIG. 2 shows a result of a test of comparing the performance in a normal (initial) state of the door weather strip 10 according to an exemplary embodiment of the present inventive concept having the configuration described above and a door weather strip according to the related art, and the performance in the state after a test environment (SPEC) where the weather door strips are exposed for 20 H (hours) at 70° C.

As criteria for evaluating the performance of the door weather strips, contact force and shape change rate were selected such that the degree of close contact of the door weather strips on a door glass can be determined from a contact force and the degree of returning to initial shapes of the door weather strips when a predetermined pressure is removed after applied to the door weather strips can be determined from a shape change rate.

A door weather strip according to the related art has a structure with two sealing lips, which are generally used for the doors of vehicles, extending from the weather door strip.

Referring to FIG. 2, D0 indicates when a door weather strip is generally mounted on a door. For the door weather strip according to an exemplary embodiment of the present inventive concept, the contact force in the initial and D0 states before the door weather strip is exposed to a test environment is 0.62 kgf and the contact force in the D0 state after the door weather strip is exposed to the test environment is 0.59 kgf. Therefore, the contact force by which the door weather strip is in contact with the door glass even after the door weather strip was exposed to the test environment was maintained at about 95% in comparison to the initial state.

However, for the door weather strip according to the related art, the contact force was 0.44 kgf in the initial D0 state, whereas the contact force reduced to 0.29 kgf, i.e., reduced by about 34% of the contact force, after the door weather strip was exposed to the test environment.

Therefore, it was determined that the door weather strip according to an exemplary embodiment of the present inventive concept further keeps the contact force and has improved durability in comparison to the door weather strip according to the related art.

On the other hand, D-2 indicates a state with a relatively smaller pressure applied to the door weather strips by spacing the door glass 2 mm further apart from the door weather strips and D+2 indicates a state with a relatively larger pressure applied to the door weather strips by moving the door glass 2 mm closer to the door weather strips from the D0 state.

The shape change rate of the door weather strip according to an exemplary embodiment of the present inventive concept was 19.1%, whereas the shape change rate of the door weather strip according to the related art was 33.5%, and accordingly, it was determined that the shape change rate of the door weather strip according to an exemplary embodiment of the present inventive concept is also excellent relatively to the door weather strip according to the related art.

Further, for the door weather strip according to an exemplary embodiment of the present inventive concept, the change in contact force is smaller, within 5% between the contact force 0.59 kgf in the initial and D-2 states, the contact force 0.62 kgf in the D0 state, and the contact force 0.59 kgf in the D+2 state.

Figure 3:
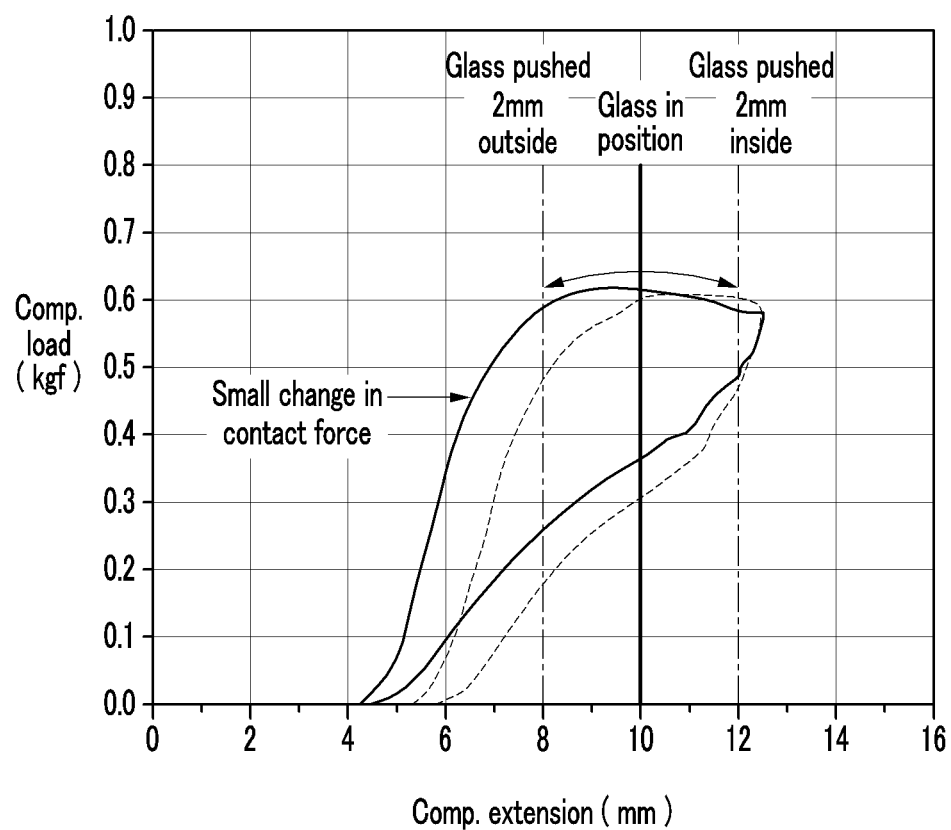
FIG. 3 is a graph showing a change in contact force of a door weather strip according to an exemplary embodiment of the present inventive concept.

FIG. 3 is a graph showing contact force of a door weather strip measured while moving a door glass in the initial state, in a weather strip according to an exemplary embodiment of the present inventive concept. It was determined that it is possible to achieve uniform performance when the door glass is moved up/down, because the change in contact force is small.

Figure 4:
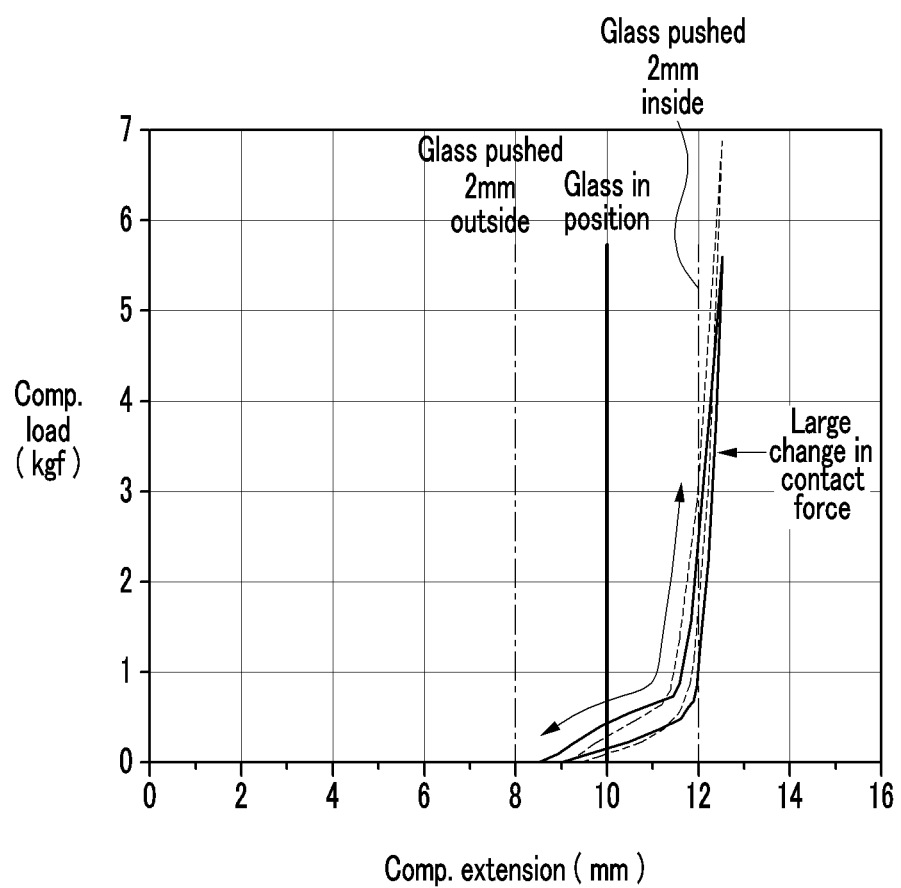
FIG. 4 is a graph showing a change in contact force of a door weather strip according to the related art.

However, for the door weather strip according to the related art, as shown in FIGS. 2 and 4, the contact force in the initial and D0 states is 0.44 kgf and the contact force in the initial and the D+2 states is 2.38 kgf, which means that the change in contact force is very large. FIGS. 2 and 4 also show that the contact force in the D0 state after the door weather strip is exposed to the test environment is 0.29 kgf and the contact force in the D+2 state is 3.25 kgf, which means that the change in contact force is also very large under position variation of about 2 mm-+2 mm of the door glass under the test environment. Therefore, with the door weather strip according to the related art, it is difficult to achieve uniform performance, when the door glass is moved up/down.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

| <Description of symbols> | |
|---|---|
| 10: Door weather strip | 12: Weather strip body |
| 14a: Upper rib | 14b: Lower rib |
| 16: Sealing portion | 20: Door panel |
| 22: Flange | |

What is claimed is:

1. A door weather strip for a vehicle, comprising:
a weather strip body having an assembly groove;
an upper rib and a lower rib extending outward from one side of the weather strip body at a predetermined distance in a height direction of the weather strip body; and
a sealing portion integrally connected with the upper rib and the lower rib, wherein
the horizontal length ratio of the entire deformation section L1 +L2 of the weather strip including the sealing portion, the upper rib, and the lower rib to the sealing portion is 3: 2, (L1+L2) : L2 =3:2, wherein:
L1 is a horizontal length of the upper rib and the lower rib from the weather strip body, and
L2 is a horizontal length of an elliptic orbit of the sealing portion.

2. The door weather strip of claim 1, wherein the sealing portion has a closed cross-section.

3. The door weather strip of claim 2, wherein the closed cross-section of the sealing portion has the shape of an ellipse.

4. The door weather strip of claim 3, wherein the sealing portion has an elliptical shape that includes the elliptical closed cross-section and that has a long axis and a short axis.

5. The door weather strip of claim 4, wherein the length ratio of the long axis to the short axis is 2:1.

6. The door weather strip of claim 4, wherein the elliptical shape is disposed at an angle of 35 degrees with respect to a vertical axis in the height direction of the weather strip body.

7. The door weather strip of claim 4, wherein the upper rib is connected with the sealing portion at a one-quarter point of the long axis of the sealing portion.

8. The door weather strip of claim 1, wherein the upper rib extends at an angle downward with respect to the height direction of the weather strip body.

9. The door weather strip of claim 8, wherein the upper rib extends at an angle of 45 degrees with respect to the vertical axis in the height direction of the weather strip body.

10. The door weather strip of claim 1, wherein the upper rib extends straight to have a longitudinally uniform thickness.

11. The door weather strip of claim 1, wherein the lower rib extends in an arc shape upward in the height direction of the weather strip body.

12. The door weather strip of claim 1, wherein the lower rib integrally extends from one end of one side of the weather strip.

13. The door weather strip of claim 1, wherein the lower rib gradually decreases in thickness in a longitudinal direction of the weather strip body.

14. The door weather strip of claim 1, wherein:
- the weather strip body has a U-shape cross-section that has the assembly groove,
- a supporting member is disposed in the weather strip body, and
- one or more sealing lips are disposed on opposite sides of the weather strip body facing each other and defining the assembly groove.

* * * * *